United States Patent [19]

Erbe

[11] Patent Number: 4,774,407
[45] Date of Patent: Sep. 27, 1988

[54] FIBER OPTIC SWITCHING SYSTEM WITH LINK MONITORING

[75] Inventor: Raymond A. Erbe, Milwaukee, Wis.
[73] Assignee: Allen-Bradley Company, Inc., Milwaukee, Wis.
[21] Appl. No.: 836,090
[22] Filed: Mar. 4, 1986
[51] Int. Cl.$^4$ ............................................. H01J 5/16
[52] U.S. Cl. .................................. 250/227; 250/229; 340/365 P
[58] Field of Search .............................. 250/227, 229; 340/365 P; 350/96.13, 96.14, 96.20; 455/612

[56] References Cited

U.S. PATENT DOCUMENTS

| | | |
|---|---|---|
| 4,152,043 | 5/1979 | Albanese . |
| 4,274,706 | 6/1981 | Tangonan . |
| 4,303,303 | 12/1981 | Aoyama . |
| 4,315,147 | 2/1982 | Harmer ................................ 250/229 |
| 4,376,566 | 3/1983 | Blackington ........................ 250/227 |
| 4,429,231 | 1/1984 | De Loach, Jr. et al. ........... 250/227 |

Primary Examiner—Edward P. Westin
Assistant Examiner—Khaled Shami
Attorney, Agent, or Firm—Quarles & Brady

[57] ABSTRACT

A fiber optic switching system for industrial control sensing applications includes a link monitoring capability for detecting faults in the fiber optic cable. Two transmitters of different wavelengths are coupled into a single fiber. The switch utilizes an optical filter which when inserted in the optical path blocks one wavelength of light but allows the other to pass through. The absence of all light in the switch output indicates a fault and the presence or absence of the filtered-out light is used to determine the switch state.

5 Claims, 3 Drawing Sheets

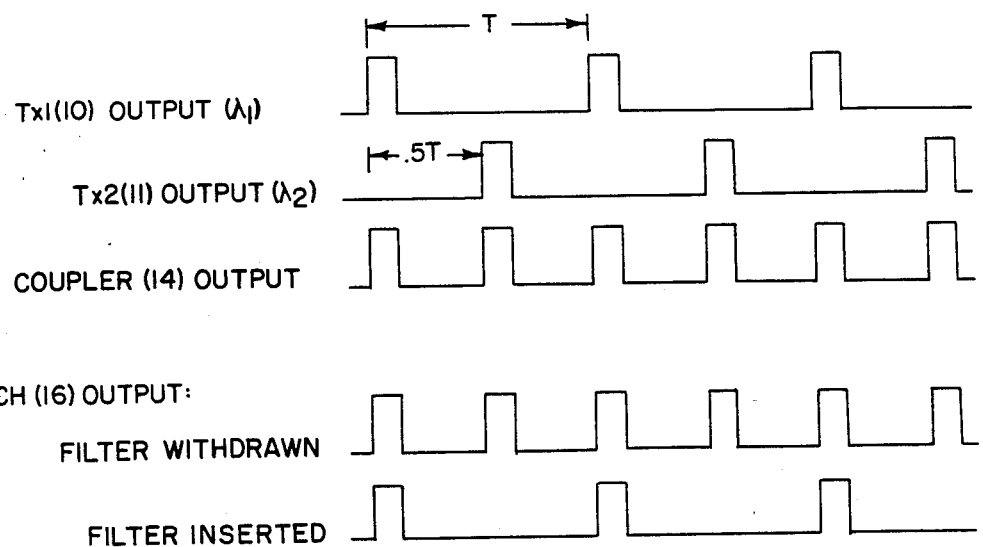
FIG. 4 SYSTEM TIMING
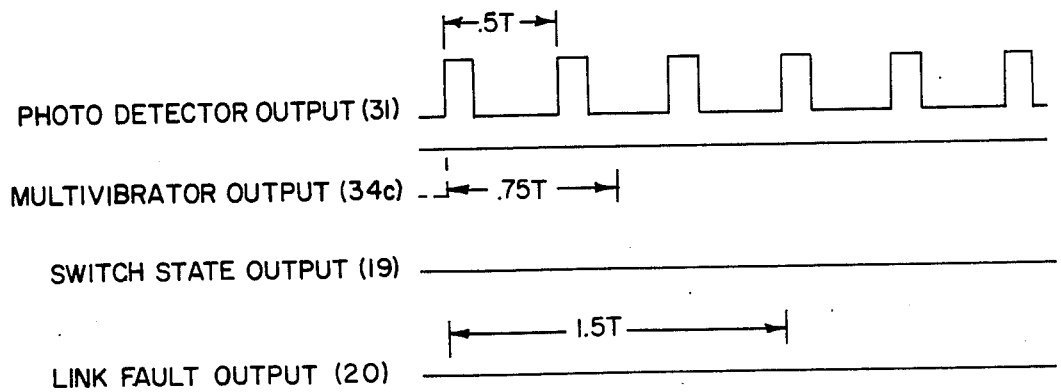
FIG. 6 RECEIVER TIMING—FILTER WITHDRAWN
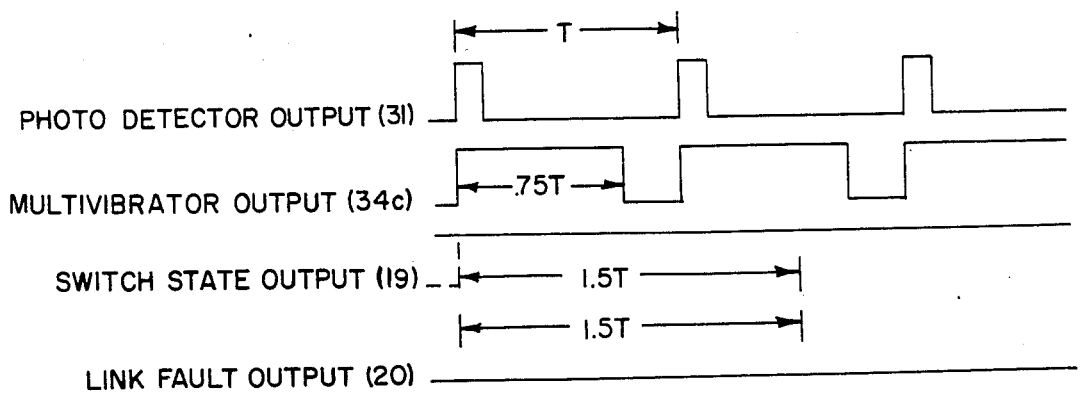
FIG. 7 RECEIVER TIMING—FILTER INSERTED

FIBER OPTIC SWITCHING SYSTEM WITH LINK MONITORING

BACKGROUND OF THE INVENTION

The field of this invention is fiber optic switching systems.

Fiber optic switching systems have been developed and used successfully in industrial applications. Such switching systems typically include a fiber optic transmitter, a fiber optic switch, a fiber optic receiver, and fiber optic cable connecting the components. The transmitter and receiver are usually located on an input/output card, such as might be used in an industrial controller, and the fiber optic switch is remotely located.

In prior switches, an opaque shutter is used in the switch mechanism. The shutter can be inserted into the optical path to block the passage of light from the transmitter to the receiver or withdrawn from the optical path to allow the light's passage. The receiver detects the presence or absence of light in the switch output and thus determines the state of the switch.

In prior fiber optic switching systems, the receiver interprets a fault condition such as a break in the fiber optic cable the same as a closed switch. That is, the receiver detects the absence of light when either the switch is closed or if the fiber optic link is faulty, regardless of the state of the switch. Therefore, a need exists for a fiber optic switching system which discriminates between a fault condition and normal system operation.

SUMMARY OF THE INVENTION

The fiber optic switching system of the invention provides a link monitoring capability to detect faults in the fiber optic cable and therefore to differentiate between a fault condition and normal switch operation. A fiber optic switching system of the invention generates two different wavelengths of light, $\lambda_1$ and $\lambda_2$, on a single fiber optic cable for input to a fiber optic switch. The switch has an internal optical path and includes an optical filter which is transparent to one wavelength, $\lambda_1$, and opaque to the other wavelength $\lambda_2$. The filter is movable within the switch so that the filter can either be inserted in the optical path or withdrawn from the optical path. When the filter is withdrawn, both wavelengths of light, $\lambda_1$ and $\lambda_2$ pass through the switch. When the filter is inserted, only one wavelength, $\lambda_1$, is allowed through the switch, the other wavelength, $\lambda_2$ being blocked by the filter. The switch output is decoded in a receiver which converts the fiber optic light signals into electrical signals corresponding to the two wavelengths $\lambda_1$ and $\lambda_2$. The receiver is able to detect the switch state based on the presence or absence of the $\lambda_2$ signal and to detect a link fault by the absence of both $\lambda_1$ and $\lambda_2$ signals.

It is therefore a primary object of the invention to provide a fiber optic switching system which is capable of detecting a fault in the fiber optic link.

It is a further object of the invention to provide a link monitoring capability with an extended service life. The fiber optic switching system of the invention can be operated with pulsed light at low duty cycles thus extending the service life of the fiber optic transmitters used to generate the two wavelengths of light, $\lambda_1$ and $\lambda_2$.

Still a further object of the invention is to provide a link monitoring capability with simplified detection circuitry in the receiver. By utilizing pulsed light and arranging the pulses of the two wavelengths $\lambda_1$ and $\lambda_2$ so that they are offset from one another and are discrete in time the receiver can detect both signals with a single photo detector which responds to both wavelengths $\lambda_1$ and $\lambda_2$. The output signals for switch state and link fault can then be decoded by the relative timing of the pulses.

The foregoing and other objects and advantages of the invention will appear from the following description. Reference is made to the accompanying drawings which form a part hereof, and in which there is shown by way of illustration a preferred embodiment of the invention. Such embodiment does not necessarily represent the full scope of the invention, however, and reference is therefore made to the claims for interpreting the scope of the invention.

BRIEF DESCRIPTION OF THE DRAWINGS

FIG. 4 is a system timing diagram for the fiber optic switching system of FIG. 1;

FIG. 6 is a timing diagram for the receiver of FIG. 5 with the filter withdrawn from the optical path as in the switch of FIG. 2;

FIG. 7 is a timing diagram for the receiver of FIG. 5 with the filter inserted in the optical path as in the switch of FIG. 3.

DESCRIPTION OF THE PREFERRED EMBODIMENT

Figure 1:
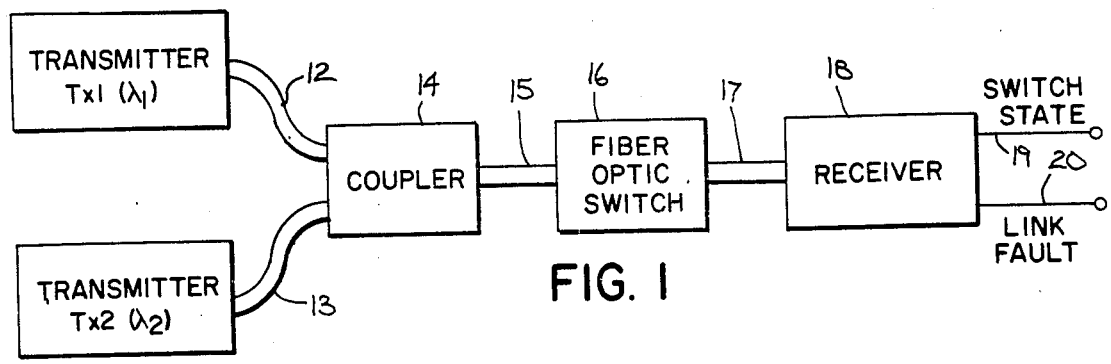
FIG. 1 is a block diagram of a fiber optic switching system which utilizes the present invention.

Referring to FIG. 1, a fiber optic switching system which provides a link monitoring capability includes two transmitters, Tx1 and Tx2. Each transmitter emits light of a single wavelength, with the first transmitter Tx1 emitting light of a first wavelength $\lambda_1$ and the second transmitter Tx2 emitting light of a second wavelength $\lambda_2$. In each transmitter Tx1 and Tx2, the light output is pulsed in a manner which is described later. While many suitable transmitters are commercially available, the particular models used in this embodiment are Model No. HFBR1404 from Hewlett Packard for Tx1, and Model No. SE4355-002 from Honeywell for Tx2. Transmitter Tx1 operates at a wavelength $\lambda_1$ of 820 nanometers and transmitter Tx2 operates at a wavelength $\lambda_2$ of 665 nanometers.

The outputs from the transmitters Tx1 and Tx2 are coupled into fiber optic cables 12 and 13, respectively, in well known fashion. The cables 12 and 13 connect the transmitters Tx1 and Tx2 to a coupler 14. The coupler 14 combines the light outputs of the separate wavelengths $\lambda_1$ and $\lambda_2$ from the two transmitters Tx1 and Tx2 onto a single output fiber 15 in well known fashion. Couplers of this type are commercially available, with the one used in the preferred embodiment being designated Model No. ODC-11-S-200 by Phalo.

The two transmitters Tx1 and Tx2 are usually co-located on an input/output card (not shown) for industrial equipment such as, for example, a programmable controller (not shown). Further, it should be apparent that the two transmitters Tx1 and Tx2, and the coupler 14 could be integrated in a single unit module.

The coupler output fiber 15 containing both wavelengths $\lambda_1$ and $\lambda_2$ is connected to a fiber optic switch 16. The fiber optic switch 16 may be remotely located from the coupler 14 and transmitters Tx1 and Tx2. The switch 16 performs a desired sensing function such as that of a manual pushbutton. Alternatively, the switch 16 could be a limit switch or some other type of sensing switch.

The fiber optic output cable 17 of the switch 16 is connected to a receiver 18, which is usually located with the transmitters Tx1 and Tx2 on an input/output card (not shown). The receiver 18 provides electrical outputs 19 and 20 for the switch state 19 and for link fault 20, respectively, as described below.

The fiber optic cables 12, 13, 15, and 17 used in this embodiment are type HC-212-T manufactured by Ensign Bickford. This cable is a 200/230 micro-meter fiber with lower attenuation at 660 nanometers than other cable types.

In prior fiber optic switching systems, a single transmitter was used. Prior switch mechanisms consisted of an opaque shutter which was moved in and out of the light path by an actuator. When the shutter was withdrawn, the light would pass through the switch. When the shutter was inserted, the light was totally blocked. It was therefore possible to determine the state of the switch by the presence or absence of light at the switch output. With such prior systems, however, a fault in the system, such as a break in the fiber optic cable, had the same effect on the output as a switch closure. Therefore, it was not possible to discern a fault condition from the normal operation of the system.

Figure 2:
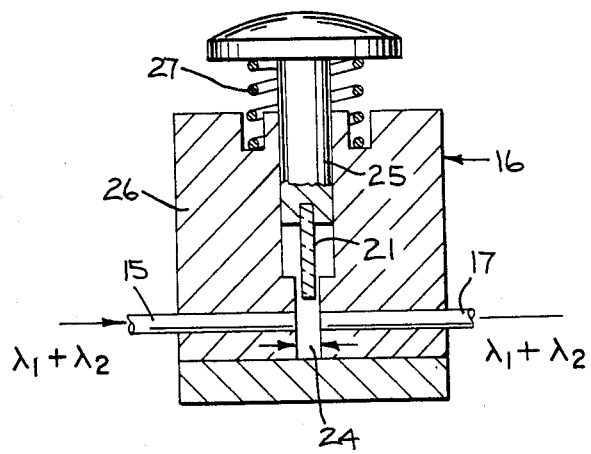
FIG. 2 is a schematic cut-away view of a fiber optic switch for the system of FIG. 1 with the switch shown in the normal (open) position.
Figure 3:
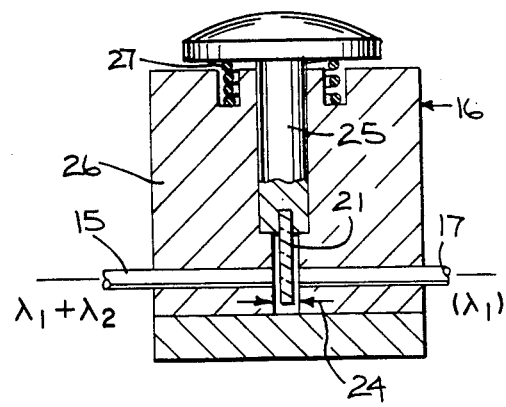
FIG. 3 is the same as FIG. 2 except with the switch shown in the engaged (closed) position.

Referring to FIGS. 2 and 3, the fiber optic switch 16 utilizes a wavelength selective filter 21 to interrupt the light path. The filter 21 has a transmission characteristic which has minimum attenuation at one wavelength, $\lambda_1$ in this embodiment, and large attenuation at the other wavelength, $\lambda_2$. Such filters are commercially available, with the one used in the preferred embodiment being designated Type IR9320 manufactured by the 3M Company.

The coupler output cable 15 is arranged coaxially with the switch output cable 17 in the switch 16 and a small gap 24 is provided between the adjacent ends of the cables 15 and 17. The gap 24 is approximately 0.040 inches wide, which allows the light to be coupled between the respective cable ends. The filter 21 is in the form of a sheet of material approximately 0.020 inches thick such that it is thin enough to fit in the gap 24. When the filter 21 is withdrawn (FIG. 2), both wavelengths of light are coupled from the coupler output cable 15 to the switch output cable 17. When the filter 21 is inserted (FIG. 3) in the gap 24, the filter 21 allows only one wavelength of light, $\lambda_1$, to be coupled to the switch output cable 17. The other wavelength, $\lambda_2$, is effectively blocked by the filter 21. In this way, under normal operating conditions, a fiber optic switching system of the invention always has at least one wavelength of light present in the output. It is therefore possible with the present invention, as detailed below, to detect a fault condition, such as a discontinuity in the optic path, by detecting the absence of both wavelengths.

Still referring to FIGS. 2 and 3, the filter 21 is carried by an actuating member 25 which is slidably retained in a switch body 26. A coil spring 27 holds the actuating member 25 in the open position (filter 21 withdrawn), while a retaining pin (not shown) limits the upward travel of the actuating member 25. It should be apparent that many other types of switch actuating members could be used for moving the filter 21 into and out of the gap 24.

Referring to FIG. 4, both transmitters Tx1 and Tx2 are pulsed at a period T. However, the second transmitter Tx2 output pulses are offset from the first transmitter output pulses by 0.5T. Further, the duty cycles of the two transmitters Tx1 and Tx2 are less than 50% so that the pulses are discrete in time (i.e. do not overlap). Lower duty cycles are preferred to reduce the on-time of the transmitters Tx1 and Tx2 with a duty cycle of approximately 10% being used in this embodiment. The period T is not critical in that a wide range of periods could be used. As a practical matter, the period T relates to the time needed to detect a change in state of the switch 16 and so should be chosen based on the system performance desired. A period T of 100 microseconds is used in this embodiment.

Still referring to FIG. 4, the output of the coupler 14 is the combination of pulses from the two transmitters Tx1 and Tx2 superimposed on one another. When the fiber optic switch 16 is in the normal (open) position, the output of the fiber optic switch 16 is identical to the coupler 14 output. However, when the fiber optic switch 16 is engaged by inserting the filter 21 in the optic path, the pulses at the first wavelength $\lambda_1$ pass through the filter and the pulses at the second wavelength $\lambda_2$ are blocked; the output of the switch 16 with the filter 21 inserted consists of the $\lambda_1$ pulses only.

Figure 5:
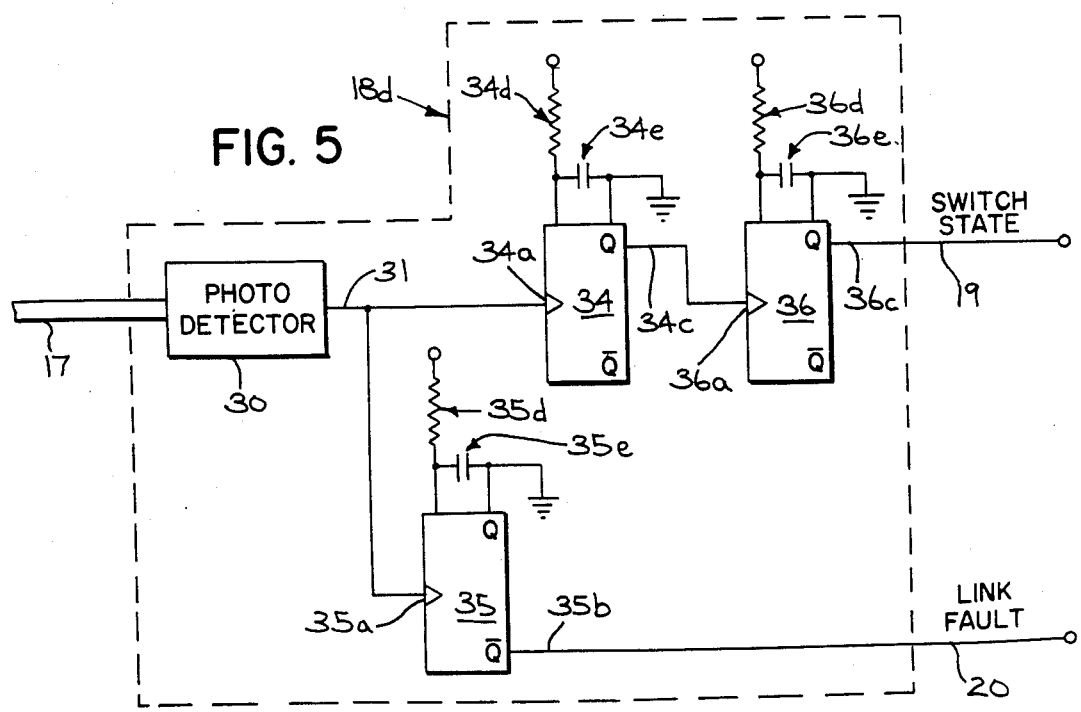
FIG. 5 is a schematic diagram of the receiver of FIG. 1.
Figure 8:
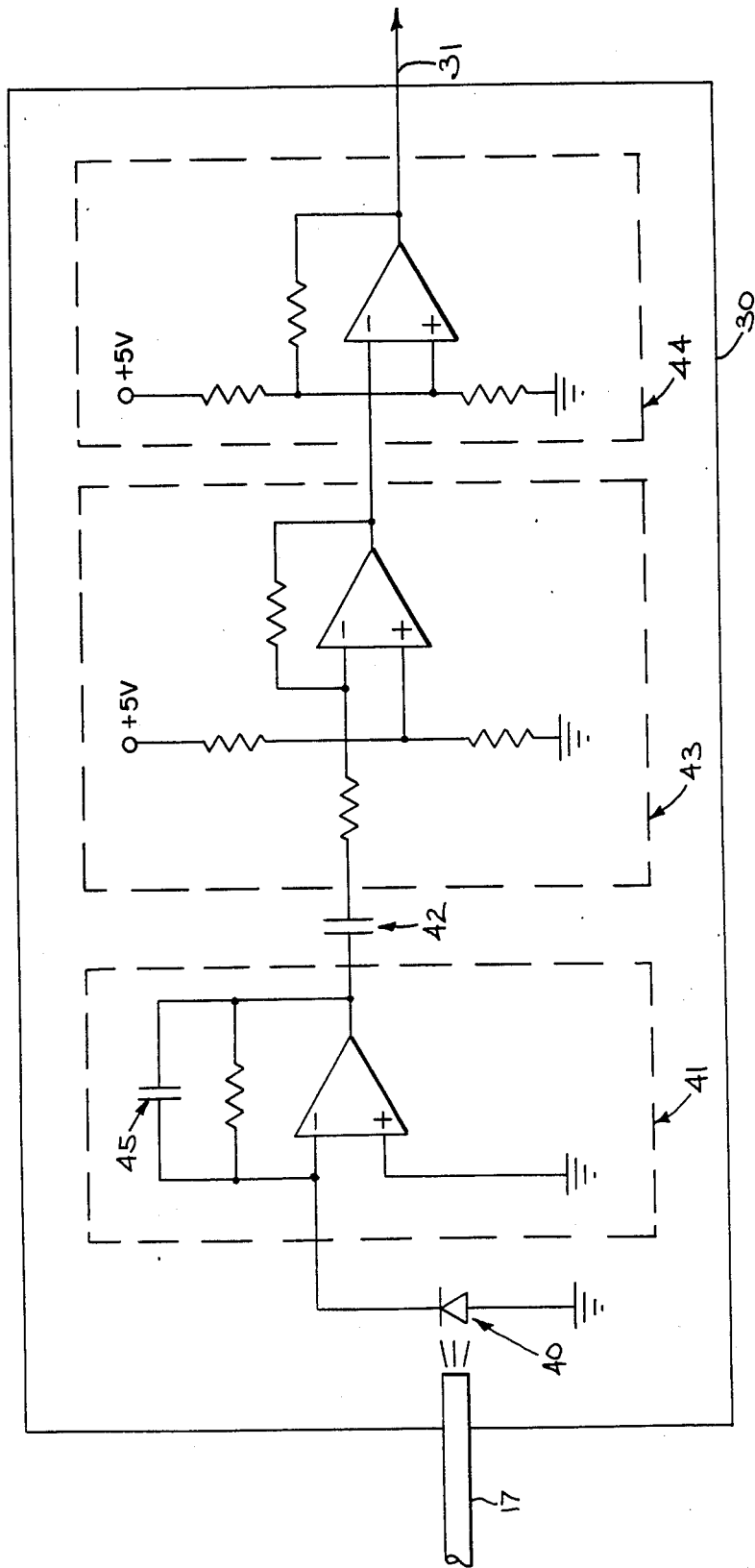
FIG. 8 is a schematic diagram of the photo detector of FIG. 5.

Referring to FIGS. 5 and 8, the receiver 18 includes a photo detector 30 which has a wide band response characteristic such that the detector 30 responds to both frequencies $\lambda_1$ and $\lambda_2$ of light. The photo detector (FIG. 8) includes a P-I-N Type diode 40 arranged to receive the light from the switch output cable 17. The actual device for the photo detector diode 40 used in this embodiment is Model No. SD3478-002 manufactured by Honeywell. The output of the diode 40 is amplified in pre-amplifier stage 41 in well known fashion. A filter capacitor 45 is used in the pre-amplifier to attenuate high frequency noise. The pre-amplifier stage 41 output is coupled by capacitor 42 to a second amplifier stage 43. The capacitor 42 blocks the D.C. signal component while passing the pulses corresponding to the incident light. The second amplifier stage 43 feeds a comparator stage 44 which detects the pulses and provides a logic output 31.

Referring again to FIG. 5, the logic output 31 is connected to the clock inputs 34a and 35a of two monostable multivibrators 34 and 35 respectively. The inverted output 35b of multivibrator 35 provides the link fault output 20. The non-inverted output 34c of multivibrator 34 is connected to the clock input 36a of a third monostable multivibrator 36. The non-inverted output 36c of multivibrator 36 provides the switch state output 19.

All three monostable multivibrators 34, 35, and 36 are of the retriggerable type. The devices preferred for this embodiment are Part No. 74122 manufactured by Texas Instruments. Multivibrator 34 has a timing resistor 34d and timing capacitor 34e connected in well known fashion with values selected to yield an output pulse duration of 0.75T. Similarly, multivibrators 35 and 36 have timing resistors 35d and 36d and timing capacitors 35e and 36e, respectively, with values selected to yield an output pulse duration of 1.5T.

Referring to FIGS. 5, 6, and 7, the operation and timing of the receiver 18 can now be described. With the filter 21 withdrawn in the switch 16 (FIG. 6), the photo detector output 31 corresponds to both $\lambda_1$ and $\lambda_2$ pulses spaced 0.5T apart. Multivibrator 34 being a retriggerable type with a 0.75T pulse duration is therefore kept continually triggered. The output 34c of multivibrator 34 is therefore continually high and no clock pulses are generated for multivibrator 36. In the absence of clock pulses, multivibrator 36 remains reset and the switch state output 19 remains low. Similarly, multivibrator 35 with a pulse duration of 1.5T is also continuously triggered and remains set. The link fault output 20 therefore remains low.

With the filter 21 inserted in the switch 16 (FIG. 7), the photo detector output 31 contains pulses corresponding to wavelength $\lambda_1$ only. Since the period of the $\lambda_1$ pulses is T, multivibrator 34 times out after the set pulse duration of 0.75T. When the next $\lambda_1$ pulse is received, multivibrator 34 is again set for another 0.75T pulse. And so a continuous train of pulses from the output 34c of multivibrator 34 are applied to the clock input 36a of multivibrator 36. Since multivibrator 36 is retriggerable with a pulse duration of 1.5T, multivibrator 36 is continuously retriggered and remains continuously set. The switch state output 19 therefore remains high indicating switch closure. Multivibrator 36 again has a 1.5T pulse duration and is continuously retriggered, keeping the link fault output 20 low.

Should a fault occur in the system, such as a break in the fiber optic cable, all pulses, both $\lambda_1$ and $\lambda_2$, will be lost. In the absence of all pulses, multivibrator 36 will reset (after a time of 1.5T of course) and the link fault output 20 will become high and remain high until pulses are restored. A latch (not shown) could be used on the link fault output 20 to lock-up on a fault condition if desired.

It should be apparent to one skilled in the art that many variations of the above preferred embodiment are possible within the scope of this invention. For example, the selection of $\lambda_1$ and $\lambda_2$ are arbitrary provided that a suitable filter is used. The fiber optic connections throughout the system could be connectorized as is well known in the art to enhance maintainability. Further, the receiver described in this embodiment could be implemented in many ways to detect the presence or absence of the $\lambda_1$ and $\lambda_2$ pulses such as with a microprocessor or other clocked logic.

It should also be apparent to one skilled in the art that the link monitoring capability of the present invention could equally be achieved using transmitters of up to 100% duty cycle and discriminating between $\lambda_1$ and $\lambda_2$ at the receiver through the use of a fiber optic splitter and separate photo detectors for each wavelength as is well known in the art. The separate photo detectors could either be wavelength selective or used in conjunction with appropriate optical filters. This approach is more complicated than the above described embodiment because it requires more optics and dual photo detectors in the receiver.

I claim:

1. A fiber optic switching apparatus with link monitoring capability comprising:
   fiber optic signal generating means operable to output light of a first wavelength and a second wavelength;
   a fiber optic switch having an input and an output, said input being connected to receive the output of the signal generating means, the switch providing an optical path between the switch input and output and having an optical filter transparent to light of the first wavelength and opaque to light of the second wavelength, said filter being moveable into and out of the optical path, wherein the switch has a first state in which the filter is withdrawn from the optical path and a second state in which the filter is inserted into the optical path; and
   a receiver coupled to said switch output which includes:
   photo detection means coupled to said switch output and operable to produce electrical signals in response to light at the first and second wavelengths;
   switch state detection means responsive to the electrical signals to indicate the switch state based on the presence of light of the second wavelength; and
   link fault detection means responsive to said electrical signals to indicate a link fault in the absence of light of the first wavelength;
   wherein, in a no-fault condition of the link, light of the first wavelength is incident upon the photodetection means regardless of the state of the switch.

2. The apparatus of claim 1, wherein the fiber optic signal generating means include:
   a first fiber optic transmitter to emit light at said first wavelength;
   a second fiber optic transmitter to emit light at said second wavelength; and
   a fiber optic coupler operable to combine the light signals from the first transmitter and the second transmitter into a single fiber optic cable.

3. The apparatus of claim 2, wherein:
   the light signal from the first transmitter output includes pulses with a fixed period T;
   the light signal from the second transmitter includes pulses with the same fixed period T; and
   wherein the pulses of the second transmitter are discrete in time with respect to the pulses of the first transmitter.

4. The apparatus of claim 3, wherein the pulses of the second transmitter are offset from the pulses of the first transmitter by a time period equal to one-half of the fixed period T.

5. The apparatus of claim 2 wherein said receiver photo detection means includes a wide band photo detector responsive simultaneously to light of both the first wavelength and the second wavelength.

* * * * *